(12) United States Patent
Gallagher et al.

(10) Patent No.: US 8,180,209 B2
(45) Date of Patent: May 15, 2012

(54) DETERMINING CAMERA ACTIVITY FROM A STEADINESS SIGNAL

(75) Inventors: Andrew C. Gallagher, Fairport, NY (US); Aaron T. Deever, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/782,960

(22) Filed: May 19, 2010

(65) Prior Publication Data

US 2011/0286731 A1    Nov. 24, 2011

(51) Int. Cl.
  *G03B 17/00* (2006.01)
(52) U.S. Cl. .......................................... 396/53; 396/52
(58) Field of Classification Search .................... 396/53, 396/54, 55, 52; 382/122, 123; 348/208.4, 348/208.14
  See application file for complete search history.

(56) References Cited

U.S. PATENT DOCUMENTS

| | | | | |
|---|---|---|---|---|
| 5,617,176 A * | 4/1997 | Matsuzawa et al. | ............ | 396/55 |
| 5,953,544 A * | 9/1999 | Kai et al. | .......................... | 396/55 |
| 6,172,707 B1 | 1/2001 | Ouchi et al. | ................ | 348/208.6 |
| 6,381,339 B1 * | 4/2002 | Brown et al. | ................. | 382/100 |
| 6,433,818 B1 | 8/2002 | Steinberg et al. | ............. | 348/161 |
| 6,809,758 B1 | 10/2004 | Jones | ........................ | 348/208.99 |
| 7,133,070 B2 | 11/2006 | Wheeler et al. | ............ | 348/223.1 |
| 7,233,684 B2 * | 6/2007 | Fedorovskaya et al. | ...... | 382/118 |
| 7,460,773 B2 * | 12/2008 | Ziemkowski | ................... | 396/52 |
| 7,496,287 B2 * | 2/2009 | Sasaki et al. | ................... | 396/54 |
| 7,574,054 B2 | 8/2009 | Gallagher et al. | ............ | 382/228 |
| 7,580,620 B2 | 8/2009 | Raskar et al. | .................... | 396/55 |
| 7,596,307 B2 * | 9/2009 | Tomita et al. | .................... | 396/52 |
| 7,619,656 B2 | 11/2009 | Ben-Ezra et al. | ........... | 348/208.4 |
| 2001/0040590 A1 * | 11/2001 | Abbott et al. | .................. | 345/700 |
| 2002/0080256 A1 | 6/2002 | Bates et al. | ..................... | 348/335 |
| 2003/0235411 A1 | 12/2003 | Morikawa et al. | ............ | 396/257 |
| 2006/0119710 A1 * | 6/2006 | Ben-Ezra et al. | ........ | 348/208.99 |
| 2007/0071426 A1 * | 3/2007 | Chujo et al. | ..................... | 396/55 |
| 2007/0098383 A1 * | 5/2007 | Stavely et al. | ................... | 396/55 |
| 2009/0046933 A1 * | 2/2009 | Gallagher et al. | ............ | 382/224 |
| 2009/0088204 A1 * | 4/2009 | Culbert et al. | .............. | 455/556.1 |
| 2009/0110303 A1 * | 4/2009 | Nishiyama et al. | ........... | 382/225 |
| 2009/0262074 A1 * | 10/2009 | Nasiri et al. | ................... | 345/158 |
| 2009/0265671 A1 * | 10/2009 | Sachs et al. | ................... | 715/863 |
| 2010/0054557 A1 * | 3/2010 | Morita et al. | ................. | 382/128 |
| 2010/0124411 A1 * | 5/2010 | Hirayama | ....................... | 396/55 |

OTHER PUBLICATIONS

Ratakonda, Real-Time Digital Video Stabilization for Multi-Media Applications, ISCAS 1998.

(Continued)

*Primary Examiner* — Clayton E LaBalle
*Assistant Examiner* — Warren Fenwick
(74) *Attorney, Agent, or Firm* — Raymond L. Owens

(57) ABSTRACT

A method of identifying the activity of a camera used for capturing an image or video, such activity not being related to the activity of subjects of the scene being captured includes determining a steadiness signal related to movement of the camera while capturing an image or video, wherein the steadiness signal identifies the motion of the camera in at least two dimensions as a function of time; and using a processor for determining a camera activity classification for the camera based on an analysis of the steadiness signal, wherein the camera activity classification includes categories of the camera being stationary, the camera being located in a moving vehicle, the camera being held by hand, or the camera being held by a jogging or walking user.

4 Claims, 7 Drawing Sheets

OTHER PUBLICATIONS

Lowe, Object Recognition From Local Scale-Invariant Features, Proc. of the 7th Intern. Conf. on Computer Vision.

Odobez et al, Robust Multiresolution Estimation of Parametric Motion Models, Jour. of Visual Comm. and Image Representation, Dec. 1995.

Stiles, Frequency and displacement amplitude relations for normal hand tremor, Journal of Applied : Physiology, Jan. 1976.

Levin et al, Understanding and evaluating blind deconvolution algorithms, CVPR 2009.

* cited by examiner

DETERMINING CAMERA ACTIVITY FROM A STEADINESS SIGNAL

CROSS REFERENCE TO RELATED APPLICATIONS

Reference is made to commonly assigned U.S. patent application Ser. No. 12/782,921, filed concurrently herewith, entitled "Estimating Gender or Age of a Photographer" by Andrew C. Gallagher et al and U.S. patent application Ser. No. 12/782,934 filed concurrently herewith, entitled "Identifying a Photographer" by Andrew C. Gallagher et al, the disclosures of which are incorporated herein.

FIELD OF THE INVENTION

The present invention is related to identifying the activity of a camera used for capturing an image or video, such activity not being related to the activity of subjects of the scene being captured, using a steadiness signal related to movement of the camera while capturing an image or video. The camera activity classification includes categories of the camera being stationary, the camera being located in a moving vehicle, the camera being held by hand, or the camera being held by a jogging or walking user.

BACKGROUND OF THE INVENTION

With the advent of digital photography, consumers are amassing large collections of digital images and videos. As a consequence, the organization and retrieval of images and videos is already a problem for the typical consumer.

Descriptors of a photographer, such as biometric data, can be detected or recorded in an image capture device such as a digital camera. Information related to the capture (either the identity of the photographer, a demographic description of the photographer, or information related to the activity of the camera such as stationary) is useful for retrieving specific images or videos from a collection.

U.S. Patent Application Publication No. 2003/0235411A1 discloses an imaging apparatus wherein a biological recording device records biological information of a photographer and subsequently uses this information to control the imaging apparatus.

U.S. Pat. No. 6,433,818 describes a camera with built-in apparatus for acquiring measured biometric data of a potential user, comparing it with corresponding biometric signature data entered in the camera, and permitting camera operation only if there is a match. This function provides security and prevents unauthorized access to the data stored on the camera, thereby discouraging theft.

U.S. Patent Application Publication No. 2002/0080256A1 describes a digital camera with built-in apparatus for biometric identification of the photographer and for recording the identification of the photographer of an image. Furthermore, this feature can be used to discourage theft or piracy of the camera. Preferably, an image of the photographer's iris is captured to determine the identity of the photographer.

U.S. Pat. No. 7,574,054 describes a method of identifying objects of interest in an image once the identity of a photographer is known. This is accomplished, for example, by knowing that a particular photographer often captures images or videos of boats. Then, the likelihood that future image or video captures will contain boats is high.

Images and videos captured with a handheld device often contain jitter resulting from normal hand tremor. For a single image, hand jitter results in a blurry image. Long exposures and zoom lenses can exacerbate the problem of image blur. For videos, hand jitter results in a shaky or wobbly video that can be visually objectionable.

Measurement of and correction for hand jitter has been studied in the prior art. Hand jitter occurring in a single image can be described through a point spread function, which represents the spread of a point source of light during an image capture. Deconvolution techniques, such as the well known Richardson-Lucy algorithm, attempt to estimate and undo the effects of the point spread function occurring during image capture. Deconvolution algorithms can attempt to estimate the point spread function based on image content. Alternatively, accelerometers present in an image capture device can provide information on the motion of the capture device during the capture period.

U.S. Pat. No. 7,133,070 describes a method for predicting the maximum exposure time that can be employed by a person with average hand tremor without causing noticeable blur in the final image.

U.S. Pat. No. 7,580,620 describes a method for removing blur in an image including fluttering a shutter open and closed during an overall exposure period, in a manner that permits accurate estimation of the point spread function associated with the overall image capture.

U.S. Pat. No. 7,619,656 describes a method for removing blur in an image including capturing secondary images along with a primary image, wherein motion is estimated among the secondary images to provide an estimate of the point spread function associated with the overall image capture.

Hand tremor occurring during a video capture is typically characterized by considering the overall camera motion during the video capture, and subtracting from that the component of the camera motion that is considered intentional. Such intentional motion could be, for example, a camera pan. Accelerometers present in a video capture device can provide information on the motion of the camera during the video capture. Alternatively, digital motion estimation techniques can be applied to frames of video data to compute the global camera motion occurring between frames.

U.S. Pat. No. 6,809,758 describes a method for automatic stabilization of an image sequence by computing global motion estimates for each image, filtering the time series of global motion estimates to determine unwanted motion, and stabilizing each frame relative to a reference frame.

U.S. Pat. No. 6,172,707 describes a method of compensating for jitter during a video sequence that combines an optical magnification with an electrical magnification to produce a constant total magnification. The amount of data cropped from the initial sensor data is varied based on how shaky the video is and much room is needed to compensate for the shake. The amount of cropping determines the amount of electrical magnification required. The amount of optical magnification is adjusted to ensure that the total magnification, and thus the field of view, remains constant.

SUMMARY OF THE INVENTION

In accordance with the present invention, there is provided a method of identifying the activity of a camera used for capturing an image or video, such activity not being related to the activity of subjects of the scene being captured, comprising:

(a) determining a steadiness signal related to movement of the camera while capturing an image or video, wherein the steadiness signal identifies the motion of the camera in at least two dimensions as a function of time; and (b) using a processor for determining a camera activity classification for the camera based on an analysis of the steadiness signal, wherein the camera activity classification includes categories of the camera being stationary, the camera being located in a moving vehicle, the camera being held by hand, or the camera being held by a jogging or walking user.

An advantage of the present invention is that the activity of a camera, including categories of the camera being stationary, the camera being located in a moving vehicle, the camera being held by hand, or the camera being held by a jogging or walking user, can be readily determined using the steadiness signal. The present invention has recognized that the steadiness signal provides a good indication of the activity of the camera.

DETAILED DESCRIPTION OF THE INVENTION

Figure 1:
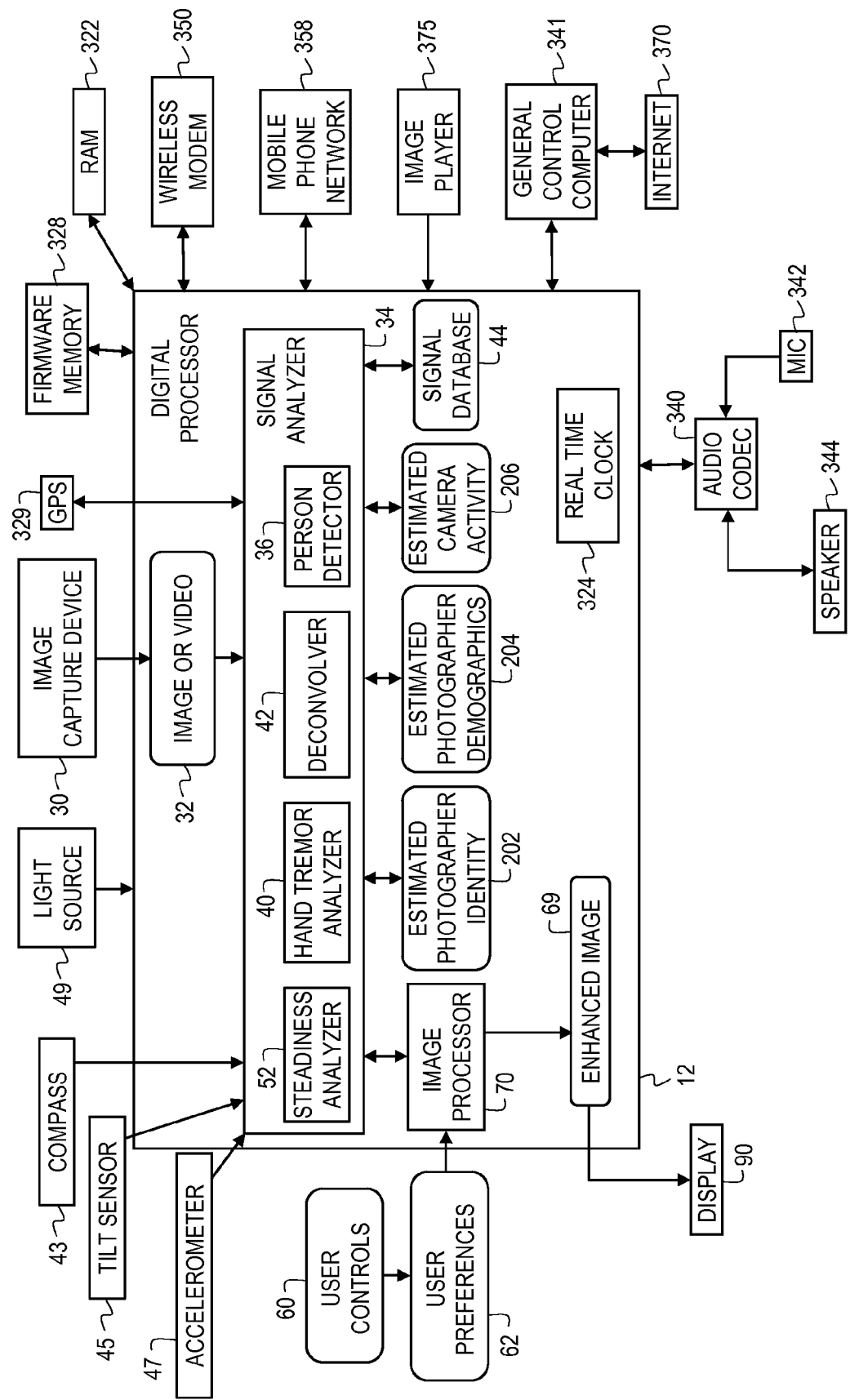
FIG. 1 is a block diagram of an image capture device and processing system that can be used to implement the present invention.

FIG. 1 is a block diagram of an image capture device and processing system that can be used to implement the present invention. The present invention can also be implemented for use with any type of digital imaging device, such as a digital still camera, camera phone, personal computer, or digital video cameras, or with any system that receives digital images. As such, the invention includes methods and apparatus for both still images and videos. The present invention describes a system that uses an image capture device 30 for capturing images and video 32. As a camera is generally not stationary at the time an image or video is captured, the recorded image is actually affected by the motion of the camera during the image or video capture. In this invention, the camera motion during an image or video capture is determined by finding a steadiness signal. This steadiness signal includes information related to the semantics of who the photographer was, and to the nature of the movement of the camera at image capture. Based on this steadiness signal, either a demographic description of the photographer is estimated, the identity of the photographer is estimated, or a camera activity is inferred.

The system of FIG. 1 is capable of displaying a digital image 32. For convenience of reference, it should be understood that the image 32 refers to both still images and videos or collections of images. Further, the image 32 can be an image that is captured with the camera or image capture device 30. Further, the image 32 can be a single-view image (i.e. a 2D image) including a single perspective image of a scene at a time, or the image 32 can be a set of images (a 3D image or a multi-view image) including two or more perspective images of a scene that are captured and rendered as a set. When the number of perspective images of a scene is two, the images are a stereo pair. Further, the image 32 can be a 2D or 3D video, i.e. a time series of 2D or 3D images. The image 32 can also have an associated audio signal. The system of FIG. 1 contains a display 90 for viewing images. The display 90 includes monitors such as LCD, CRT, OLED or plasma monitors, and monitors that project images onto a screen. The sensor array of the image capture device 30 can have, for example, 1280 columns×960 rows of pixels. When necessary, the image capture device 30 activates a light source 49, such as a flash, for improved photographic quality in low light conditions.

In some embodiments, the image capture device 30 can also capture and store video clips. The digital data is stored in a RAM buffer memory 322 and subsequently processed by a digital processor 12 controlled by the firmware stored in firmware memory 328, which can be flash EPROM memory. The digital processor 12 includes a real-time clock 324, which keeps the date and time even when the system and digital processor 12 are in their low power state.

The digital processor 12 operates on or provides various image sizes selected by the user or by the system. Images are typically stored as rendered sRGB image data is then JPEG compressed and stored as a JPEG image file in the memory. The JPEG image file will typically use the well-known EXIF (EXchangable Image File Format) image format. This format includes an EXIF application segment that stores particular image metadata using various TIFF tags. Separate TIFF tags can be used, for example, to store the date and time the picture was captured, the lens F/# and other camera settings for the image capture device 30, and to store image captions. In particular, the ImageDescription tag can be used to store labels. The real-time clock 324 provides a capture date/time value, which is stored as date/time metadata in each Exif image file. Videos are typically compressed with H.264 and encoded as MPEG4.

In some embodiments, the geographic location stored with an image captured by the image capture device 30 by using, for example a Global Positioning Satellite (GPS) sensor 329. Other methods for determining location can use any of a number of methods for determining the location of the image. For example, the geographic location can be determined from the location of nearby cell phone towers or by receiving communications from the well-known Global Positioning Satellites. The location is preferably stored in units of latitude and longitude. Geographic location from the GPS sensor 329 is used in some embodiments to regional preferences or behaviors of the display system.

The graphical user interface displayed on the display 90 is controlled by user controls 60. The user controls 60 can include dedicated push buttons (e.g. a telephone keypad) to dial a phone number, a control to set the mode, a joystick controller that includes 4-way control (up, down, left, right) and a push-button center "OK" switch, or the like. The user controls 60 are used by a user to indicate user preferences 62 or to select the mode of operation or settings for the digital processor 12 and image capture device 30.

The display system can in some embodiments access a wireless modem 350 and the internet 370 to access images for display. The system is controlled with a general control computer 341. In some embodiments, the system accesses a mobile phone network 358 for permitting human communication via the system, or for permitting signals to travel to or from the display system. An audio codec 340 connected to the digital processor 12 receives an audio signal from a microphone 342 and provides an audio signal to a speaker 344. These components can be used both for telephone conversations and to record and playback an audio track, along with a video sequence or still image. The speaker 344 can also be used to inform the user of an incoming phone call. This can be done using a standard ring tone stored in firmware memory 328, or by using a custom ring-tone downloaded from the mobile phone network 358 and stored in the memory 322. In addition, a vibration device (not shown) can be used to provide a quiet (e.g. non audible) notification of an incoming phone call.

The interface between the display system and the general purpose computer 341 can be a wireless interface, such as the well-known Bluetooth wireless interface or the well-known 802.11b wireless interface. The image 32 can be received by the display system via an image player 375 such as a DVD player, a network, with a wired or wireless connection, via the mobile phone network 358, or via the internet 370. It should also be noted that the present invention can be implemented with software or hardware or both and is not limited to devices that are physically connected or located within the same physical location. The digital processor 12 is coupled to a wireless modem 350, which enables the display system to transmit and receive information via an RF channel. The wireless modem 350 communicates over a radio frequency (e.g. wireless) link with the mobile phone network 358, such as a 3GSM network. The mobile phone network 358 can communicate with a photo service provider, which can store images. These images can be accessed via the Internet 370 by other devices, including the general purpose computer 341. The mobile phone network 358 also connects to a standard telephone network (not shown) in order to provide normal telephone service.

Referring again to FIG. 1 the digital processor 12 accesses a set of sensors including a compass 43 (preferably a digital compass), a tilt sensor 45, a GPS device 329, and an accelerometer 47. Preferably, the accelerometer 47 detects both linear and rotational accelerations for each of three orthogonal directions (for a total of 6 dimensions of input). In the preferred embodiment, each of these sensing devices are present, but in some embodiments, one or more of the sensors is absent.

The digital processor 12 includes a signal analyzer 34 that analyses the inputs from the sensors including the accelerometer 47, the tilt sensor 45, the compass 43 the GPS sensor 329, and the images and videos 32. The analysis is preformed by a steadiness analyzer 52, a hand tremor analyzer 40, a deconvolver 42, and optionally a person detector 36. The analysis includes producing intermediate signals called steadiness signals and compares these intermediate signals with signals from a signal database 44, as will be shown in more detail in FIG. 2. The output of the signal analyzer 34 is one or more of the following: an estimated photographer identity 202; an estimated photographer demographics 204; or an estimated camera activity 206.

Further, an image processor 70 is applied to the images or videos 32 based on output from the signal analyzer 34 and user preferences 62 to produce an enhanced image 69 that is shown on the display 90. The image processor 70 improves the quality of the original image or video 32 by, for example, removing the hand tremor from a video.

Figure 2:
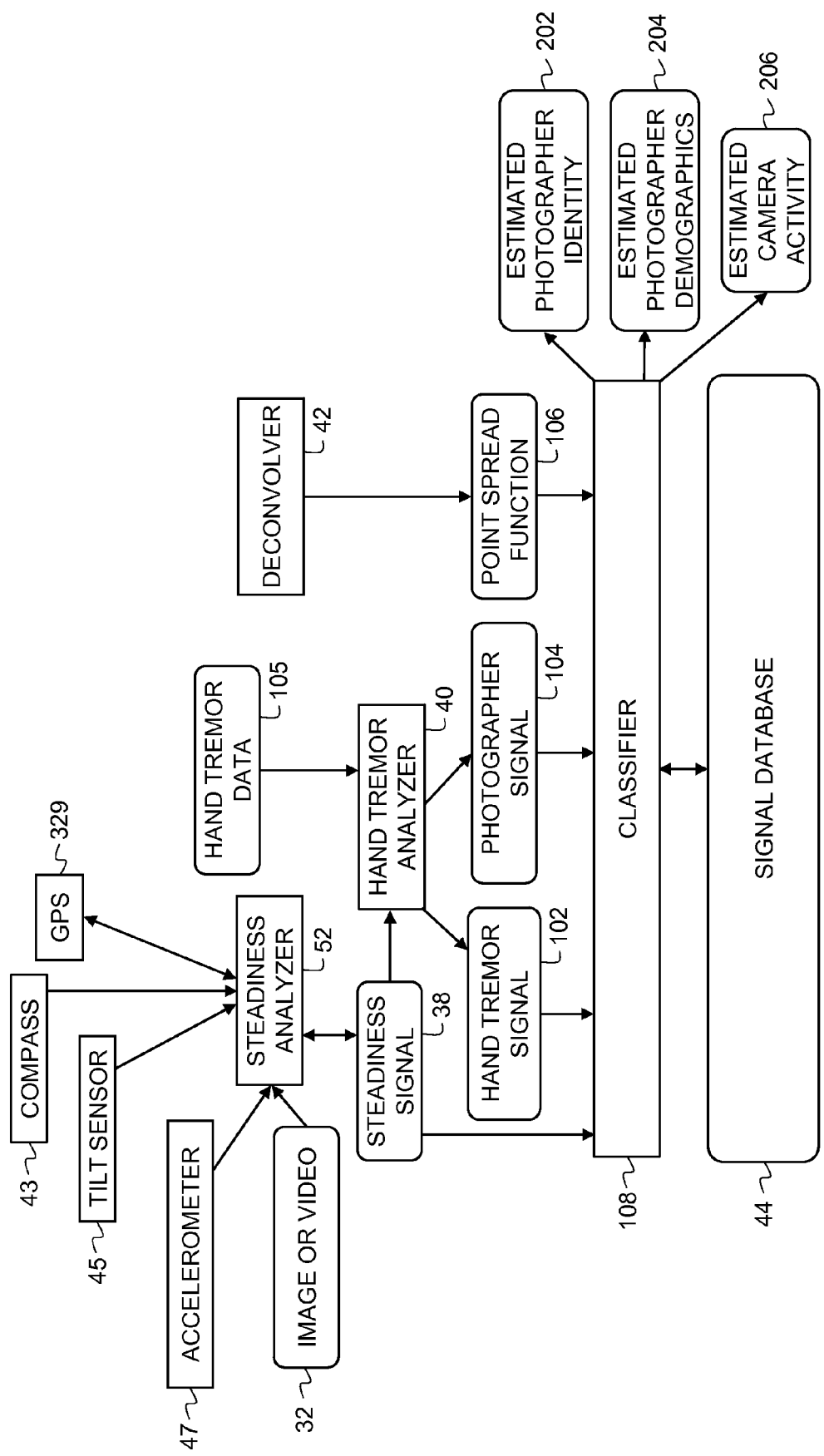
FIG. 2 is a block diagram that illustrates the operation of the digital processor 12 shown in FIG. 1.

FIG. 2 shows the operation of the signal analyzer 34 in more detail. The steadiness analyzer 52 receives inputs from the accelerometer 47, tilt sensor 45, compass 43, GPS 329 and receives the images or videos 32 from the image capture device 30. The steadiness analyzer 52 produces a steadiness signal 38 that describes the motion of the camera. Preferably, the steadiness signal 38 describes the motion of the camera in at least two dimensions (e.g. along the x-axis and along the y-axis, where these axes define the dimensions of the image plane). The steadiness signal 38 is preferably in units of Pixels of motion per second, although other units of measurement also provide useful performance. For example, in some embodiments, the steadiness signal 38 is in units of mm/second, or in units of radians per second when measuring angular motions.

Figure 3:
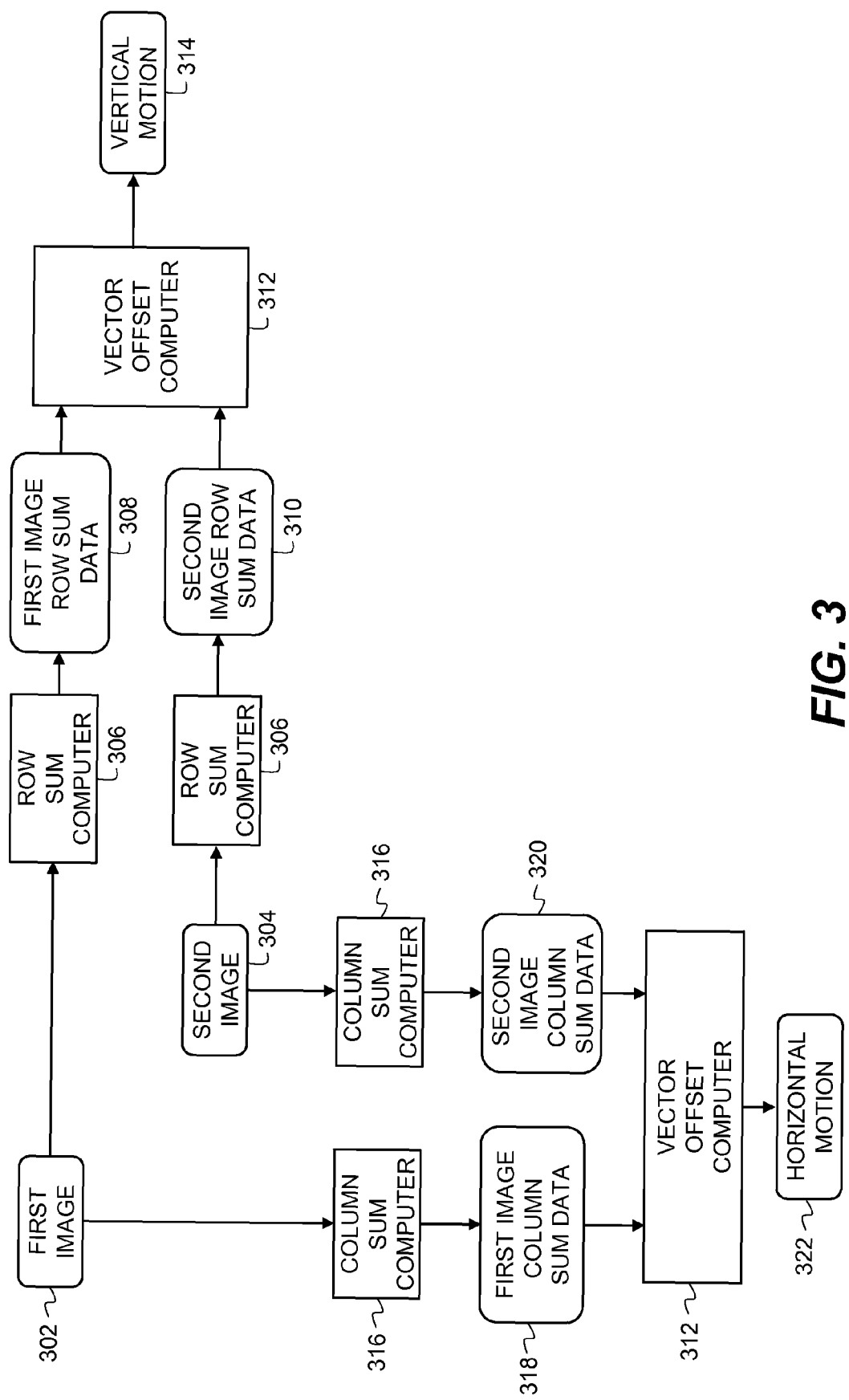
FIG. 3 is a flow chart for computing global motion according to an embodiment of the present invention.

In one embodiment, the steadiness signal 38 is determined directly from the image frames of a video 32. In other words, the steadiness signal 38 is determined by providing at least two frames (preferably adjacent frames) from a video, and storing the frames in memory and comparing the pixel values of the frames for determining the steadiness signal. One method for determining the steadiness signal 38 from the image frames of a video 32 is by assuming a translational motion model and computing the horizontal and vertical translational motion between each pair of consecutive image frames. This can be performed by using integral projection matching, as described in "Real-Time Digital Video Stabilization for Multi-Media Applications," by Ratakonda, in ISCAS 1998. The process is illustrated in FIG. 3. The first image 302 and the second image 304 are the inputs for the integral projection matching algorithm. The first image 302 is input to the row sum computer 306 which computes a vector of first image row sum data 308, that is to say for each row of the first image 302, it computes the sum of pixel data values in that row. Similarly, the second image 304 is input to a row sum computer 306 which computes a vector of second image row sum data 310. The first image row sum data 308 and second image row sum data 310 are input to a vector offset computer 312, which computes the offset that effectively matches the two input vectors. Those skilled in the art will recognize that there are many methods by which to find the matching offset between two vectors, including increasing cross correlation or reducing the sum of squared errors. In a preferred embodiment, the offset is determined by reducing the sum of absolute errors. The determined offset represents a vertical motion 314 between the first image 302 and second image 304.

Similar steps are used to determine the horizontal motion between the two images. Specifically, the first image 302 is input to a column sum computer 316 which computes a vector of first image column sum data 318, that is to say for each column of the first image 302, it computes the sum of pixel data values in that column. Similarly, the second image 304 is input to a column sum computer 316 which computes a vector of second image column sum data 320. The first image column sum data 318 and second image column sum data 320 are input to a vector offset computer 312, which computes the offset that matches the two input vectors. The determined offset represents the horizontal motion 321 between the first image 302 and second image 304.

In another embodiment, the steadiness signal 38 is determined by tracking one or more points of interest throughout a time interval of frames of the video. For example, the well known algorithm SIFT (scale invariant feature transform) described by D. G. Lowe, Object Recognition From Local Scale-Invariant Features in *Proceedings of the 7th International Conference on Computer Vision* is used to detect interest points in two frames (preferably adjacent) in the video. By finding matching interest points between the frames, the motion vectors that track interest points are found. The collection of these motion vectors are included in the steadiness signal and describe both the motion of objects in the scene, and the motion of the camera. As yet another embodiment, the well known method of optical flow is used to determine the steadiness signal.

Another method for determining the steadiness signal 38 from the image frames of a video 32 is by fitting a parametric motion model to the data. In particular, a six parameter motion model computes the translational motion (two parameters) along with rotational motion (three additional parameters) and zoom motion (sixth and final parameter). Such an approach is described in "Robust Multiresolution Estimation of Parametric Motion Models," by J. M. Odobez and P. Bouthemy, in Journal of Visual Communication and Image Representation, December 1995.

Another method for determining the steadiness signal 38 from the image frames of a video 32 is described in U.S. Pat. No. 6,809,758. In this method, horizontal and vertical translational motion is computed between frames by considering block motion vectors. Block-based motion estimation is well known in the art, and is used in many video coding algorithms such as the MPEG algorithms. A two-dimensional motion vector histogram is formed from the block motion vector estimates. Histogram bins containing few entries are eliminated. The motion vectors from the remaining bins are averaged to determine the horizontal and vertical global motion estimates.

The steadiness signal 38 encapsulates a description of the camera's motion in at least two dimensions over time. It is important to realize that camera motions captured by the steadiness signal 38 include motions associated with hand tremor as well as the movement of the camera for re-framing the scene to the photographer's satisfaction. Further, the camera movement can be the result of other factors, some intentional and some not, such as but not limited to:

vehicular movement: the camera is inside of a moving vehicle (e.g. car, airplane, bicycle)

photographer movement: the photographer can be running or walking to reposition herself with respect to the scene subject searching: the photographer can be scanning the scene in search of a specific object, or merely scanning for interesting content noise The steadiness signal 38 undergoes further processing by the hand tremor analyzer 40 to determine the portion of the steadiness signal that is related to hand tremor. The output of the hand tremor analyzer 40 is the hand tremor signal 102 (that portion of the steadiness signal associated with hand tremor) and the photographer signal 104 (that portion of the steadiness signal associated with intentional movement of the camera). This hand tremor analyzer 40 operates on the steadiness signal 38 by using hand tremor data 105 that describes typical hand tremors. For example (see "Frequency and displacement amplitude relations for normal hand tremor," R. Stiles, Journal of Applied Physiology, January 1976), hand tremors can be in the range of 4 to 9 Hz, and deliberate camera motions have energy in lower frequencies. In the preferred embodiment, a linear convolution filter in constructed with a cutoff in the range of 2 to 4 Hz and is applied by the hand tremor analyzer 40 to the steadiness signal 38 to produce the photographer signal. In the preferred embodiment, the sum of the hand tremor signal 102 and the photographer signal 104 is the steadiness signal 38.

Another measure of camera motion that can be found even in a single image or in a single frame of video is the point spread function of the image capture system. It is well known that when the camera is moving during the exposure of an image, then the motion of the camera defines the point spread function. A deconvolution process, preformed by the deconvolver 42, is used to recover a point spread function 106 of the image. The process of recovering a point spread function from a single image, although difficult, has been the focus of much recent research. For example, "Understanding and evaluating blind deconvolution algorithms" by A. Levin at al, CVPR 2009, demonstrates the recovery of point spread functions from single images with several different algorithms. Note that the point spread functions are inherently in the dimensions of the x-axis and the y-axis, and the motion occurs over the exposure time for the image, and the exposure time is typically stored as metadata in the image header. Also, it is known that the point spread function can vary over the frame of the image when the camera is rotated during the image exposure. In this case, the deconvolver 42 recovers only a single point spread function 106 or a set of point spread functions 106 corresponding to different positions in the image plane.

The analysis signals (steadiness signal 38, hand tremor signal 102, photographer signal 104 and point spread function 106) are input to the classifier 108 for comparison with signals in a signal database 44. The classifier 108 is any classifier known in the art of machine learning, for example, KK-nearest neighbor, support vector machine, AdaBoost, or any of a number of other classifiers. The classifier 108 inputs the aforementioned analysis signals (or any subset of the aforementioned analysis signals) and outputs estimated photographer identity 202, estimated photographer demographics 204, or estimated camera activity 206.

The output from the classifier 108 can take one of several forms. For example, when estimating photographer identity 202, the output from the classifier 108 can be a single name (e.g. "Thomas Paine") indicating that the classifier 108 believes that the photographer is that person (Thomas Paine). Preferably, the classifier 108 outputs a list of names of potential photographers and also outputs a probability associated with each name, for example:

| Thomas Paine | 0.38 |
| Crispus Attucks | 0.32 |
| Nathan Hale | 0.15 |
| James Madison | 0.15 |

Similarly, for estimated photographer demographics 204, the classifier 108 preferably outputs a likely demographic description (e.g. in terms of the age and the gender) of the photographer. For example, an estimated age is indicated as follows:

Age of photographer: 16-20 with 90% confidence
21-29 with 10% confidence
and
Gender of photographer: Male (85% confidence).

The indicated age can take other forms, such as categorical age estimation. For example:

Age of photographer: child with 80% confidence
Senior with 20% confidence

Convenient age categories for the photographer are Baby (0-2), young child (3-7), older child (8-12), teen (13-19), young adult (20-36), adult (37-65), senior (66+). In other embodiments, the estimated age is determined as a estimated age and a margin of error (e.g. 36 years old, plus or minus 5 years with 90% confidence). In general, older photographers exhibit more hand shake than younger photographers. Further, younger photographers tend to deliberately move the camera across the scene more than older photographers. The classifier 108 implicitly uses the statistics associated with each of the age and gender categories in order to distinguish between the age and gender categories for producing estimated photographer demographics 204.

The motion of the image capture device 30 provides an indication of the activity of the camera (the image capture device 30) at the time the image or video 32 is captured. Note that the activity of the camera is not the same as the activity of the subject of the image or video 32. For example, when the image capture device 30 is mounted in a tripod, then the camera activity is "stationary" because the image capture device 30 is not moving. However, the subjects in the video 32 captured by the stationary image capture device might be dancing, jumping, running or traveling by bicycle. The activity of subjects of a video is typically determined by analyzing the content (i.e. pixel values and captured audio) from the video itself. It is a feature of the present invention to determine an estimated camera activity 206 so that at a future time, a user can easily find (for example) images or videos that were captured with a stationary camera, or images or videos that were captured from a handheld camera.

The classifier 108 outputs the estimated camera activity 206, preferably indicating both a camera activity category and a level of confidence. Possible categories include:
  the camera being stationary
  the camera being located in a moving vehicle
  the camera being held by hand the camera being held by a jogging or walking user.
The categories include a hierarchy of categories in some cases, for example, "the camera being located in a moving vehicle" includes the subcategories:
  the camera being located in a moving car
  the camera being located in an airplane
  the camera being located on a bicycle
  the camera being located on a helicopter
Each subcategory can again contain additional subcategories.

The classifier 108 is capable of producing the estimated camera activity 206 because the motion of the camera that is encapsulated in the steadiness signal 38 is related to the mode of travel of the camera or lack thereof. For example, if the camera is moving rapidly in a linear direction (e.g. at velocity over 200 kph), then the most likely estimated camera activity 206 is that the camera is located on a moving vehicle, and that the moving vehicle is an airplane. Further, a stationary camera such as an image capture device 30 held in a tripod will have a steadiness signal with only a small magnitude of motion, generally below the motion exhibited by the shake from hand tremors. This small magnitude of motion in a video provides evidence that the estimated camera activity 206 associated with the video is "likely to have been captured by a stationary camera."

Figure 4B:
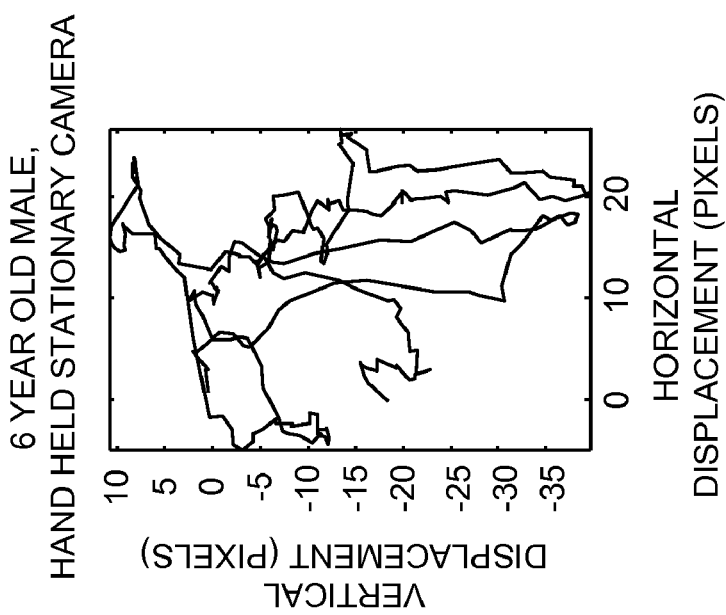
FIGS. 4A-4E are plots of different steadiness signals and signal analysis derived during video capture by cameras used by different photographers.
Figure 4A:
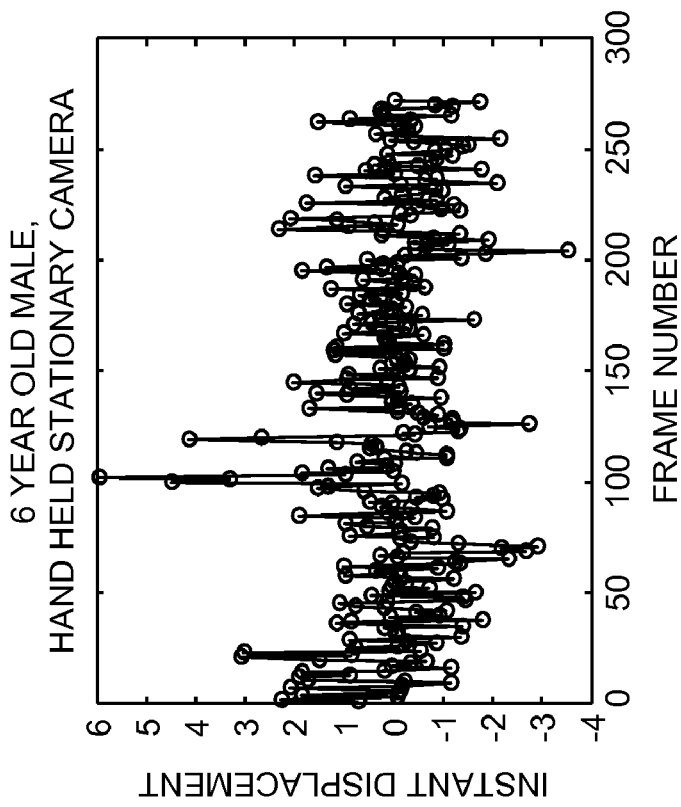

In the preferred embodiment, the classifier 108 performs feature extraction on the input signals 38, 102, 104, 106 to extract information that relates to the classification task at hand. Feature extraction is well known in the art of machine learning and artificial intelligence, and will not be described herein. As an example, of the features that are extracted from the input signals 38, 102, 104, 106,
  1. global statistics: the mean and deviation of the input signals, and the mean and deviations of the input signals over fixed time intervals (e.g. 1 second, or 30 frames when video is captured at a rate of 30 frames per second).
  2. bounding boxes: the area of the box required to contain values of the steadiness signal 38 over a fixed time interval.
  3. Fourier features: the energy content in the input signals across specific frequency bands.
  4. signal integrations: integrals of the input signals over fixed time intervals.
As an example that testifies to the effectiveness of the approach of the present invention, FIGS. 4A-E show signal examples from videos captured by individuals. FIG. 4A is the steadiness signal 38 that shows the global horizontal displacement (in pixels) between adjacent frames of a short video captured by a 6 year old male who was holding the camera by hand. FIG. 4B shows the integral of the steadiness signal from FIG. 4A which shows the relative displacement of each frame of the video from the first frame (represented at (0,0) in the plot).

Figure 4D:
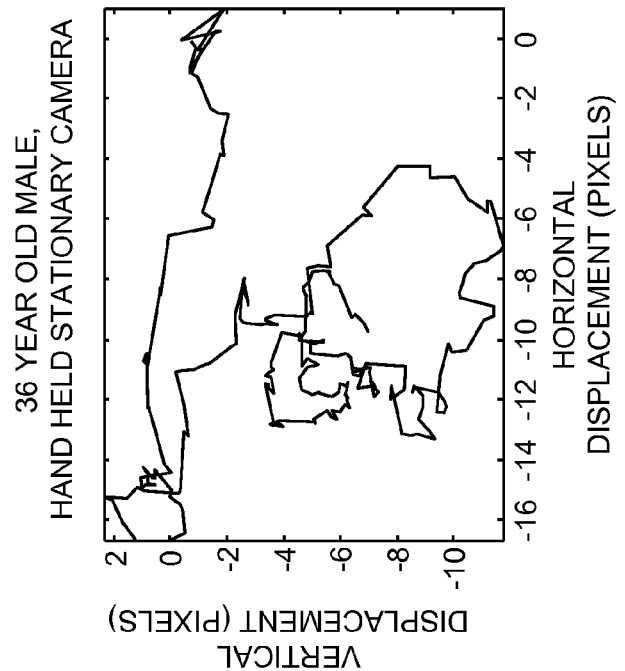
Figure 4C:
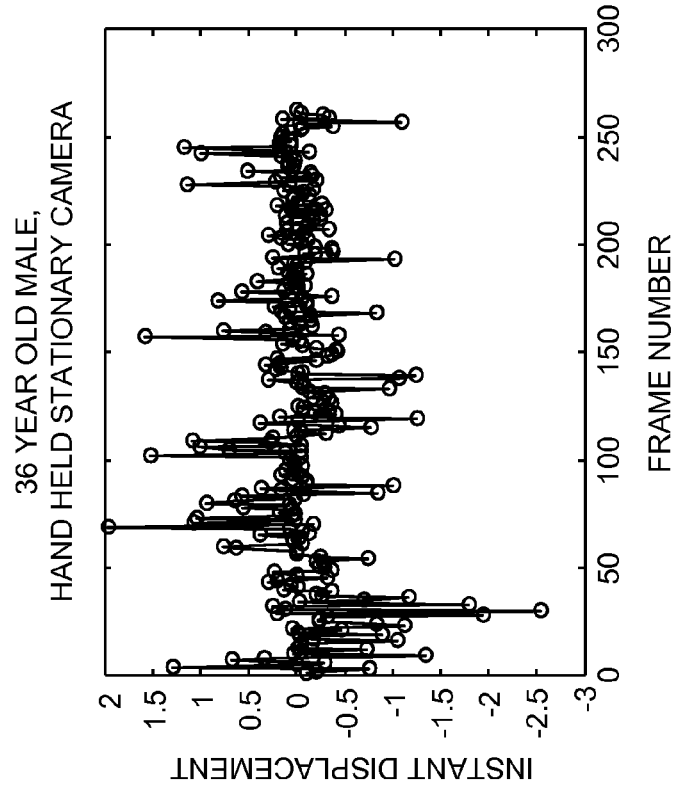

FIGS. 4C and 4D show the corresponding horizontal displacement between adjacent frames of a video and the relative displacement of each from of the video from the first frame (respectively) for a video captured by a 36 year old male. In this experiment, each person was asked to hold the camera by hand while reducing the camera motion. One can easily see that the adult male was able to keep the camera motion to have smaller magnitude than the child. In fact, small children often have larger displacements in the video that they capture merely because their attention is drawn to many objects in the scene, and it can be difficult for a child to maintain a fixed camera position on a single subject for a long while.

Figure 4E:
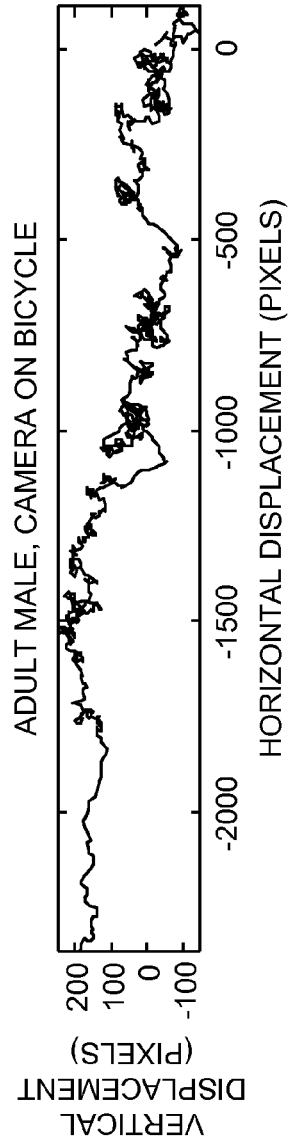

FIG. 4E shows the global motion (the integral of the steadiness signal that shows the relative displacement of each frame to the first frame in the video) for a short video captured from a bicycle. Notice that the video contains a large amount of horizontal displacement, typical for a video captured by bicycle.

Figure 5B:
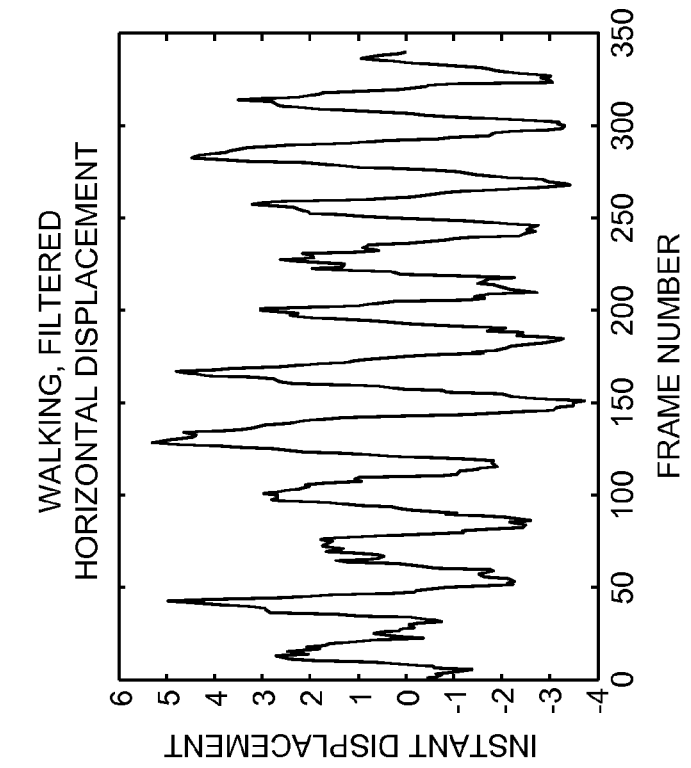
FIGS. 5A-5D are plots of steadiness signals and signal analysis derived during video capture by cameras used by walking and running photographers.
Figure 5A:
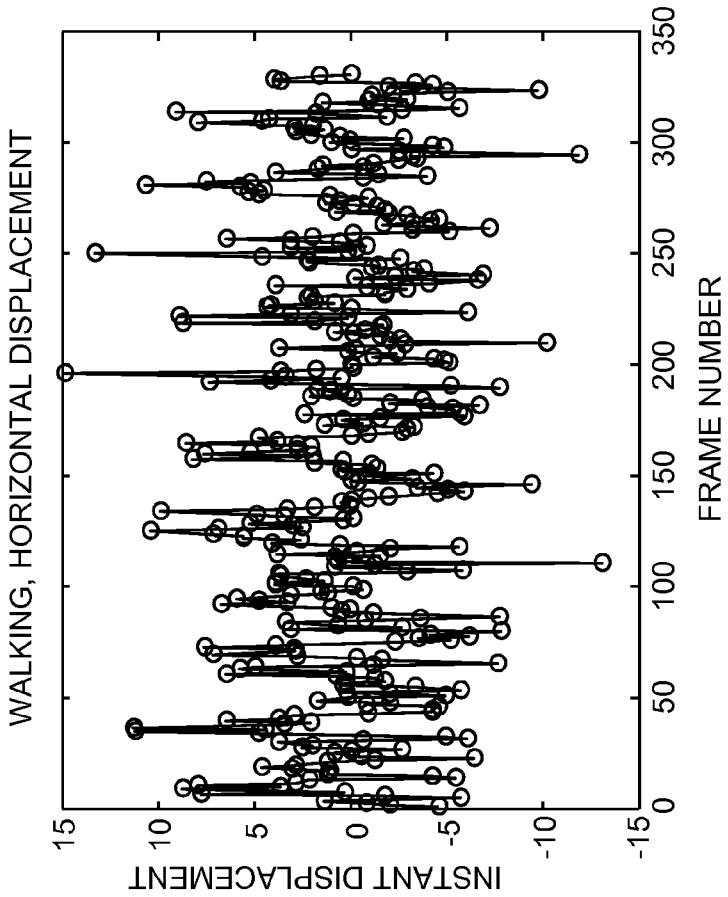
Figure 5D:
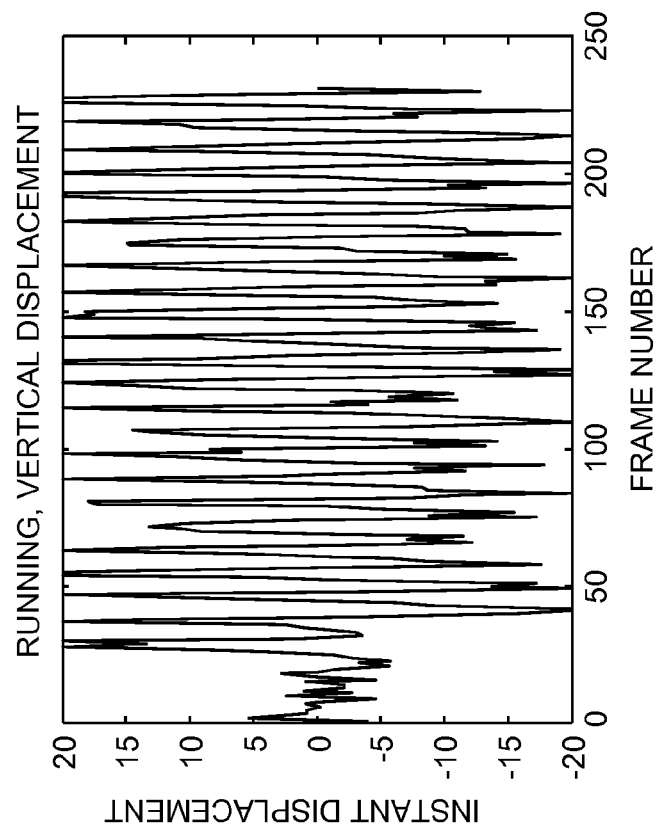
Figure 5C:
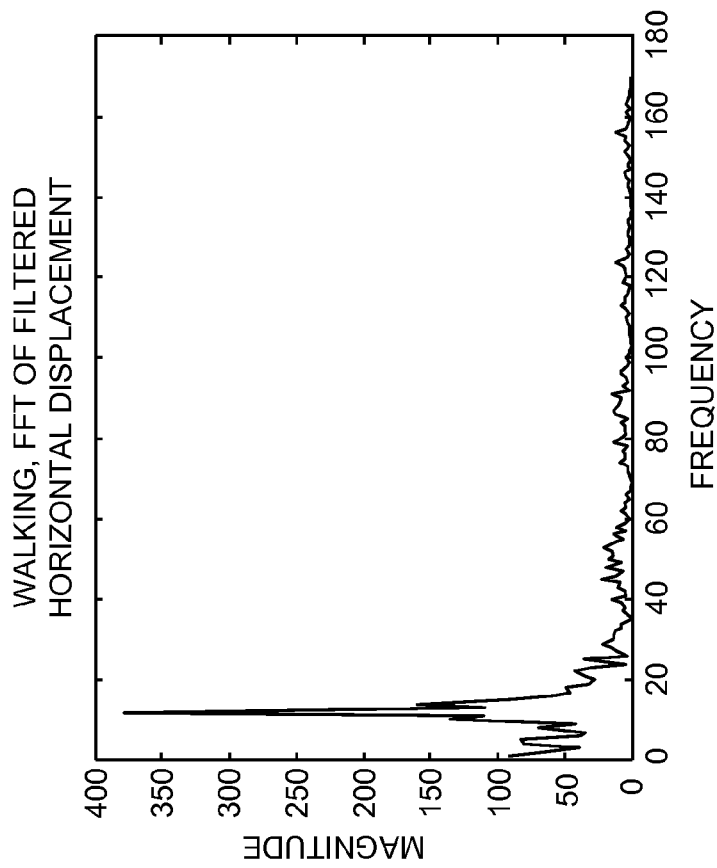

Further examples that testify to the effectiveness of the approach of the present invention are shown in FIGS. 5A-5D, which show signal examples from videos captured by an individual. FIG. 5A is the steadiness signal 38 that shows the global horizontal displacement (in pixels) between adjacent frames of a short video captured by a 36 year old, 6' 5" tall male while walking FIG. 5B shows the same signal filtered with a 10-tap moving average filter to remove high frequency information. FIG. 5C shows the magnitude of the Fourier transform of the filtered signal. As can be seen, the video exhibited a periodic, low-frequency, horizontal sway. This feature is common in videos captured while walking, with a swaying frequency that corresponds to the gait of the user holding the camera. In this example, the period is approximately 30 frames, corresponding to one second of video captured at 30 frames per second. The user in this example is walking at a pace of approximately 120 steps per second. This can be seen both in the periodicity of FIG. 5B as well as the peak magnitude present in FIG. 5C. The steadiness signal 38 that shows the horizontal displacement can be used not only to identify that the user is walking, but also to provide demographic information on the user. The walking motion can be viewed as a swinging pendulum, and similar to the behavior of a pendulum, people with shorter legs typically have higher stepping frequency than people with longer legs. Thus kids tend to walk with higher stepping frequency than adults, and women tend to walk with higher stepping frequency than men, and shorter people tend to walk with higher stepping frequency than taller people.

FIG. 5D is the steadiness signal 38 that shows the global vertical displacement (in pixels) between adjacent frames of a short video captured by a 36 year old, 6' 5" tall male while running (beginning at about frame 30). As can be seen, the video exhibited large amplitude, periodic, vertical jitter. In this example, the frequency of the vertical jitter corresponds to a stepping frequency of approximately 210 steps per second. Vertical jitter is more pronounced in jogging or running scenarios, in which the body is experiencing greater vertical movement than while walking The large amplitude and periodic nature of the vertical jitter combine to suggest a jogging or running user.

In some embodiments, the classifier 108 also has access to additional information, such as the air temperature or other ambient air attributes, the camera make and model, or the size, weight, position of lens, location and size of displays on the camera, or the positions of the hands, fingers, head or face on the camera or the moments of inertia of the camera. These factors affect the amount of movement of the camera when capturing an image or video. For example, in some cases, a user holds a camera up to her eye to view the scene through an eyepiece. Effectively, this position includes using the head to brace the camera and modifies the signature of the camera movement that is also affected by the demographics of the photographer, the identity of the photographer, and the camera activity. Further, if the camera contains a large display screen, the user tends to hold the camera away from her body when composing an image or capturing a video which tends to increase the amount of shake in the camera. When these factors are known to the classifier 108, the classifier handles this information by, for example, building a separate model to classify the demographics of the photographer, the identity of the photographer, or camera activity, for each camera model or group of similar camera models.

Note that in some embodiments it is beneficial to normalize the analysis signals (steadiness signal 38, hand tremor signal 102, photographer signal 104 and point spread function 106) with respect to the size of the image or video 32 or the focal length of the capture device 30 at the time of capture. Image or video size can be expressed in terms of the number of pixels in the image or video as well as the pixel size on the image sensor. In the case that the accelerometer 47 provides capture device motion data in terms of angular rotation, normalization may not be needed, as the angular rotation data provided by the accelerometer 47 is independent of the size of the captured image or video 32 as well as the focal length of the image capture device 30. In the case that the capture device motion data is computed by analysis of the image or video 32 and provided in units of pixels per second, it is beneficial to normalize the motion data with respect to image size or focal length. For example, for a camera having a 10× zoom lens, camera motion of 5 pixels at the highest zoom magnitude is equivalent to camera motion of only 0.5 pixels at the lowest zoom magnitude. Similarly, for a camera that can capture a 12 Megapixel image, and can also capture a 3 Megapixel image by binning together the charge of four similar pixels in a 2×2 neighborhood, camera motion of 20 pixels in a 12 Megapixel image is equivalent to camera motion of 10 pixels in a corresponding 3 Megapixel image.

A signal database 44 is a set of analysis signals that are used for "training" the classifier 108. Training classifiers 108 to perform classification tasks is well known in the art of machine learning. The classifier 108 implements a support vector machine, but can alternatively implement k-nearest neighbor, AdaBoost, Logistic regression, decision trees, or any of a number of classification methods. Preferably, the classifier 108 is trained using a set of "ground truth" signals from a signal database 44. The signal database 44 includes a set of signals (such as steadiness signals 38, hand tremor signals 102, photographer signals 104, and point spread functions 106), where each signal has an associated label indicating either the demographic description of the photographer (e.g. age and gender), the identity of the photographer (e.g. a photographer identification number, URL, email address, or name), or the camera activity (stationary, traveling by vehicle, handheld, carried by a walking or jogging human). If the classifier 108 implements nearest neighbor classification, then the input steadiness signal 38, hand tremor signal 102, photographer signal 104 or point spread function 106 are compared with corresponding signals from the signal database 44. Comparison is performed by any reasonable distance metric, preferably Euclidean distance. Then, the estimated photographer identity 202 is the identity of the photographer associated with the signal from the signal database 44 that was determined to be most similar to the signal input to the classifier 108. Those skilled in the art of machine learning realize that the classifier 108 need not always compare an input signal with examples in a signal database 44, but rather the classifier 108 is often used to learn patterns in the training signals that correspond to specific classes that provide useful discrimination between the classes of interest.

The invention has been described in detail with particular reference to certain preferred embodiments thereof, but it will be understood that variations and modifications can be effected within the spirit and scope of the invention.

| PARTS LIST | |
|---|---|
| 12 | digital processor |
| 30 | image capture device |
| 32 | image or video |
| 34 | signal analyzer |
| 36 | person detector |
| 38 | steadiness signal |
| 40 | hand tremor analyzer |
| 42 | deconvolver |
| 43 | compass |
| 44 | signal database |
| 45 | tilt sensor |
| 47 | accelerometer |
| 49 | light source |
| 52 | steadiness analyzer |
| 60 | user controls |
| 62 | user preferences |
| 69 | enhanced image |
| 70 | image processor |
| 90 | display |
| 102 | hand tremor signal |
| 104 | photographer signal |
| 105 | hand tremor data |
| 106 | point spread function |
| 108 | training classifier |
| 202 | photographer identity |
| 204 | photographer demographics |
| 206 | camera activity |
| 302 | first image |
| 304 | second image |
| 306 | row sum computer |
| 308 | row sum data |
| 310 | row sum data |
| 312 | vector offset computer |
| 314 | vertical motion |
| 316 | column sum computer |
| 318 | column sum data |
| 320 | column sum data |
| 321 | horizontal motion |
| 322 | RAM buffer memory |
| 324 | real-time clock |
| 328 | firmware memory |
| 329 | GPS sensor |
| 340 | audio codec |
| 341 | computer |
| 342 | microphone |
| 344 | speaker |
| 350 | wireless modem |
| 358 | phone network |
| 370 | internet |
| 375 | image player |

The invention claimed is:

1. A method of identifying an activity of a camera used for capturing an image or video, such activity not being related to activities of subjects of a scene being captured, comprising:
   (a) determining a steadiness signal related to movement of the camera while capturing an image or video, wherein the steadiness signal identifies the motion of the camera in at least two dimensions as a function of time further including providing at least two frames from a video, and storing the frames in memory and comparing corresponding pixel values of the frames for determining the steadiness signal, and (b) using a processor for determining a camera activity classification for the camera based on an analysis of the steadiness signal, wherein the motion of the camera activity classification includes categories of the camera being stationary, the camera being located in a moving vehicle, the camera being held by hand, or the camera being held by a jogging or walking user.

2. The method of claim 1, further including an accelerometer integral with the camera responsive to camera movement for determining the steadiness signal and for applying such signal to the processor.

3. The method of claim 1, wherein the compared pixel values are from two adjacent frames.

4. The method of claim 1, further including providing a single image and using pixels from the single image to perform a deconvolution operation to determine the steadiness signal.

* * * * *